April 3, 1951     D. P. GRAHAM     2,547,700
SELF-PROPELLED RAILWAY VEHICLE
Filed Aug. 25, 1947     4 Sheets-Sheet 1
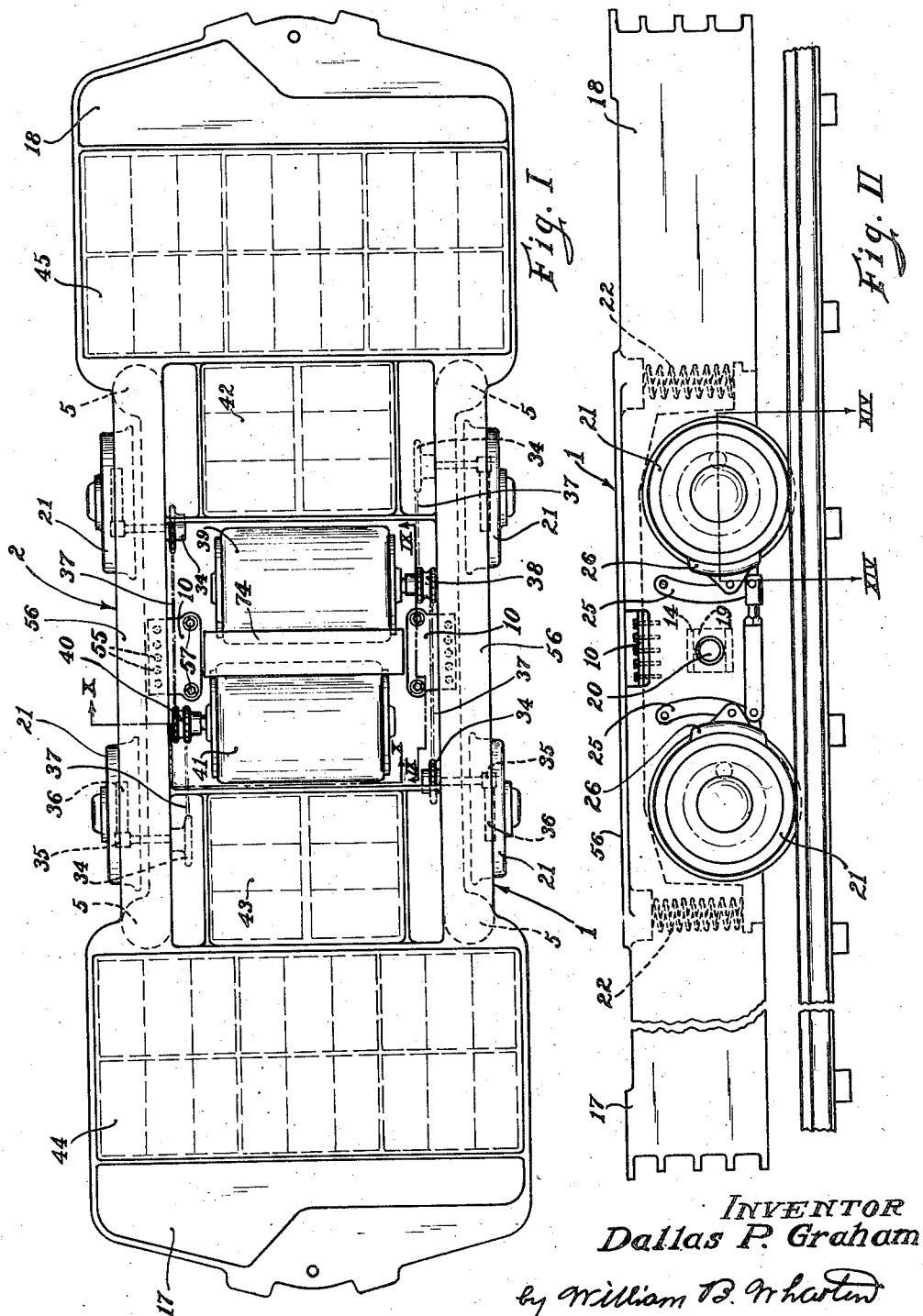
INVENTOR
Dallas P. Graham
by William B. Wharton
his attorney April 3, 1951 — D. P. GRAHAM — 2,547,700
SELF-PROPELLED RAILWAY VEHICLE
Filed Aug. 25, 1947 — 4 Sheets-Sheet 2
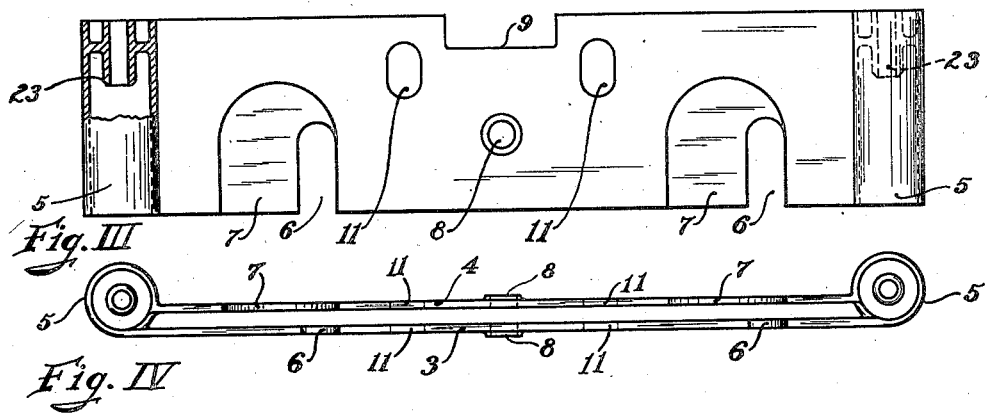
Fig. III
Fig. IV
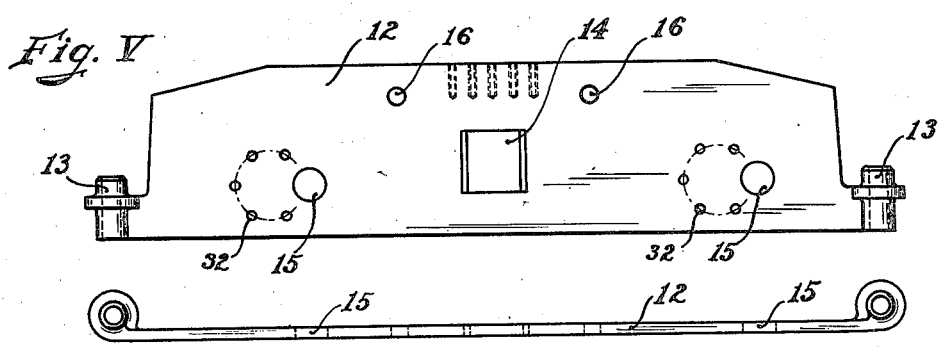
Fig. V
Fig. VI
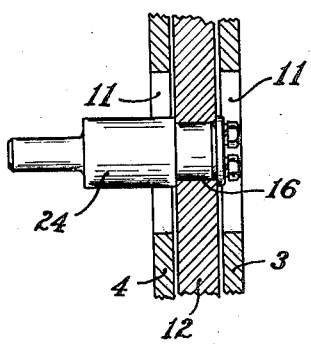
Fig. VIII
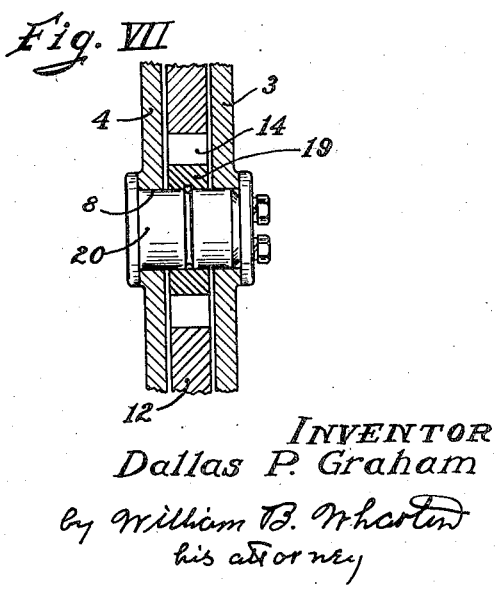
Fig. VII
INVENTOR
Dallas P. Graham
by William B. Wharton
his attorney April 3, 1951     D. P. GRAHAM     2,547,700
SELF-PROPELLED RAILWAY VEHICLE
Filed Aug. 25, 1947     4 Sheets-Sheet 3
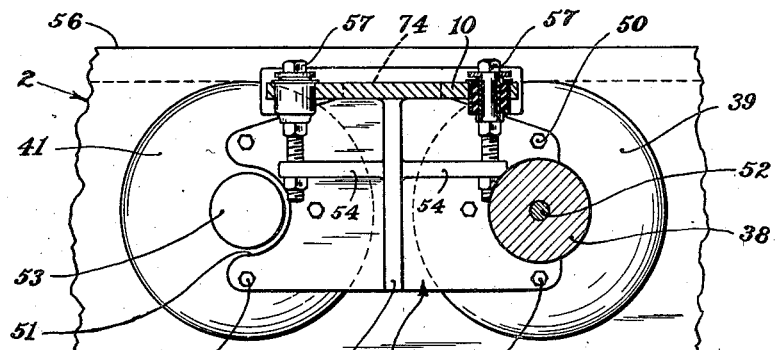
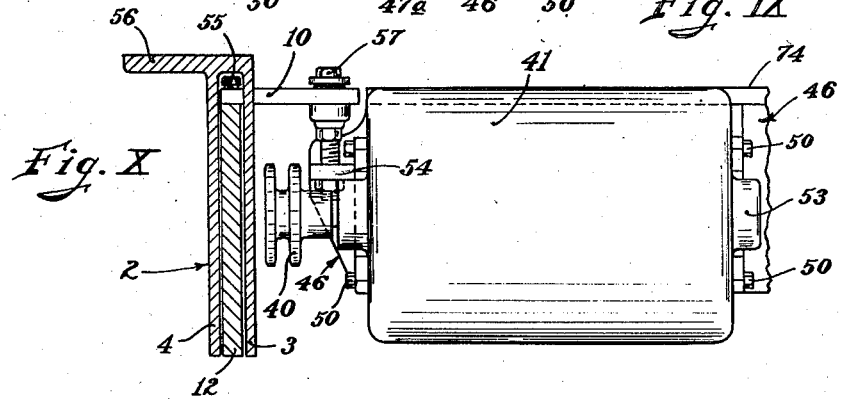
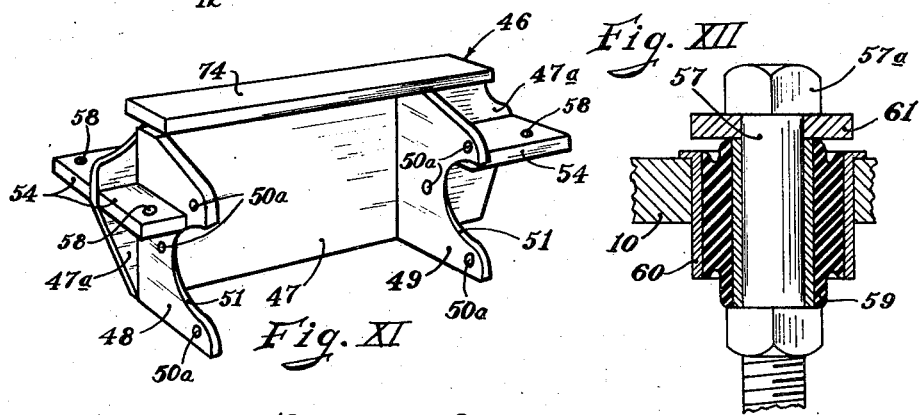
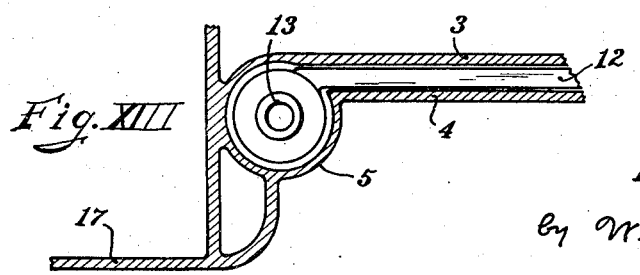
INVENTOR
Dallas P. Graham
by William B. Wharton
his attorney

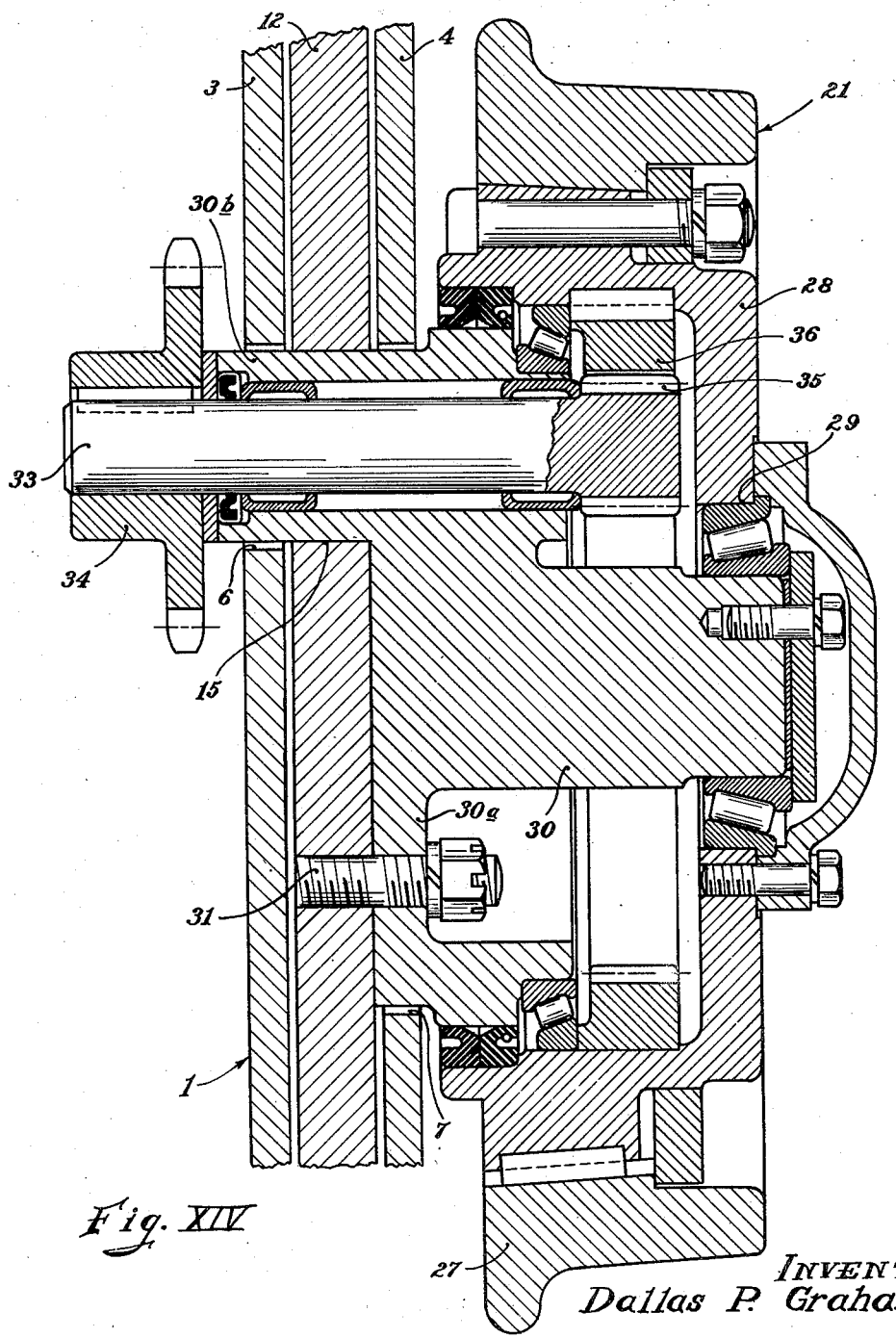
Fig. XIV
INVENTOR
Dallas P. Graham
by William B. Wharton
his attorney

Patented Apr. 3, 1951

2,547,700

UNITED STATES PATENT OFFICE 2,547,700

SELF-PROPELLED RAILWAY VEHICLE

Dallas P. Graham, Columbus, Ohio, assignor to Greensburg Machine Company, Greensburg, Pa., a corporation of Pennsylvania Application August 25, 1947, Serial No. 770,385

6 Claims. (Cl. 105—100)

This invention relates to a self-propelled railway vehicle, and particularly to vehicles of that sort which are adapted to use as locomotives or as independent self-propelled haulage vehicles in mines and other industrial installations.

Many problems rise in the structure of those vehicles both along general and along specialized lines. Some such problems are concerned with the stability of such vehicles with respect to their track engagement and with the smoothness and efficiency of their propulsion. Other more specialized problems relate to the balance of the vehicle under the action of specialized driving connections, to such driving connections, to limitation in the height and width of the vehicle and to the accommodation and mounting power elements such as motors and batteries.

In accordance with the existence of such problems, one object of my invention is so to mount and so to drive the wheels that a maximum of space for the mounting of power instrumentalities, or power instrumentalities and power sources, is provided within a vehicle body strictly limited in height.

Another object of my invention is to provide wheel-mounting means and wheel-driving connections which of themselves are particularly compact and desirable.

Another object of my invention is to adapt the balancing and traction transmitting frame structure disclosed in the application of Rudolf R. Schubert, Serial No. 712,376, to the assembly of wheel structure, wheel mounting and driving means and connections disclosed herein and to adapt the herein disclosed power elements and driving elements of the vehicle assembly to a balancing and traction-transmitting frame structure of that indicated sort.

In the accompanying drawings, which exemplify the embodiment of my invention:

Fig. I is a plan view of the self-propelled railway vehicle of my invention, illustrating the general arrangement of the vehicle structure but omitting various elements of the vehicle structure.

Fig. II is a side elevation of the vehicle as shown in Fig. I.

Fig. III is a side elevation of the median region of one side of the primary frame structure of the vehicle, excluding the end platforms and buffer structures of the frame.

Fig. IV is a bottom plan view of the portion of the frame structure shown in Fig. III.

Fig. V is a side elevation of one of the oscillating beams which carry driving and braking elements of the vehicle assembly in fixed relation to the track-contacting wheels of the vehicle.

Fig. VI is a bottom plan view of the oscillating beam shown in Fig. V.

Fig. VII is a fragmentary vertical sectional view showing the pivotal mounting of the oscillating beam and structure adjacent the pivot.

Fig. VIII is a fragmentary vertical sectional view showing the mounting of a brake hanger on the oscillating beam.

Fig. IX is a fragmentary end elevation of two electrical motors for propelling the vehicle and of the bracket for mounting the said motors, the elements supporting the said bracket being shown partially in section on the section line IX—IX of Fig. I.

Fig. X is a fragmentary view showing one of the said driving motors in side elevation and showing the primary frame of the vehicle and one of the oscillating beams by which the motor bracket is carried in vertical section on the section line X—X of Fig. I.

Fig. XI is an isometric view of the motor bracket.

Fig. XII is a vertical sectional view through one of the supporting elements for the motor bracket, showing the supporting element on an enlarged scale.

Fig. XIII is a fragmentary longitudinal sectional view on an enlarged scale showing the junction of one side frame member with one of the end structures of the vehicle.

Fig. XIV is an enlarged horizontal sectional view taken through one of the wheel assemblies of the vehicle and its associated structural element in the plane of the section line XIV—VIV of Fig. II.

Considering first the frame structure of the vehicle as shown in the drawings, the primary frame consists of the elements 1 and 2 which are identical in structure and which are reversed in their positions in the vehicle assembly. Frame element 1, shown in detail in Figs. III and IV comprises two laterally spaced plates 3 and 4, which are integrated at both ends of the frame element with the tubuar spring housings 5. From their lower edges inner plate 3 and outer plate 4 are respectively cut away to provide spaces 6 for straddling one region of each of two wheel axles and more extended spaces 7 for straddling more extended regions of the axles. Centrally between the axle-embracing spaces in the plates, there are aligned holes 8 in both plates for receiving a pin to make pivotal connection between the primary frame element and an oscillating beam. Extended downwardly from the upper edges of both plates there are slots 9 to receive the ends of motor-supporting bracket bars 10. Through both plates 3 and 4 there are holes 11 for the passage of brake-mounting connections.

Each of the frame elements 1 and 2 comprises also an enclosed plate, or beam, 12 which lies between the two outer plates 3 and 4 of the frame element. The structure of this beam is shown individually in Figs. V and VI of the drawings. As there shown, each beam 12 carries at its ends spring-seating structures 13 arranged to underlie the spring housings 5 included in each of the structure of the laterally spaced plates 3 and 4 between which beam 12 lies in the frame assembly. In its median region beam 12 has a straight-sided window 14 adapted slidably to receive a pivot block by which the beam and the outer plates of the frame element are connected with provision for relative movement therebetween. The beam also has adjacent its ends two holes 15 for the passage of wheel-driving connections, and adjacent window 14 it has two holes 16 for mounting brake hangers.

The side frame elements 1 and 2 are both integrated with end structures 17 and 18 of the vehicle. Desirably such integration may be effected by welding the end structures of the vehicle to the spring housings 5 of the frame elements.

In the assembly of the beams and outer plates of the frame elements with each other and with the vehicle wheels, a pivot block 19 is slidably mounted in window 14 of each beam, the window being of greater vertical extent than the height of the pivot block, and the sliding contact being between the vertical walls of the window 14 as illustrated in dotted lines in Fig. II. A pivot pin 20 passes through the pivot block and through the aligned holes in the spaced plates 3 and 4 between which the beam lies, and is secured to one or both of those plates. This mounting permits each of the beams 12 to oscillate with respect to the outer plates, or fixed frame members, with which it is associated and the excess height of the windows 14 permits each of the pivot blocks 19 to move vertically therein to provide limited bodily movement between the beam and the plates.

As will be described in detail, the wheels 21 of the vehicle are connected with beams 12 by structures which are embraced by cut-away spaces 6 and 7 of inner plate 3 and outer plate 4 respectively and pass through holes 15 of the beam. The wheels thus are tied to the beam, so that the beam responds with oscillatory movement when track-inequalities cause abrupt changes in the relative vertical positions of the wheels associated with it. Coil springs 22 are confined in spring housings 5 and extend vertically between seats 23 in the housings and spring seats 13 at the ends of the beam. Load is thus transmitted yieldingly between the wheels and the fixed frame structure of the vehicle and most of the oscillatory movement of the beam is absorbed yieldingly by the springs. It will be noted that the regions of load transmission are longitudinally remote from the pivot point about which the beam oscillates.

The vehicle brakes are carried by the oscillating beams 12 which are tied to the wheels of the vehicle, and they therefore move with the wheels and maintain a set clearance from the wheel treads regardless of irregularity in the positions of the wheels. It is possible therefore to have the normal clearance of the brakes in wheel-releasing position very slight, and thus to minimize the movement necessary to set the brakes. The brake mounting consists, as shown in Figs. I and VIII, of a pin 24 engaged in holes 16 of the beam. Brake hangers 25 carry brake shoes 26 in close proximity to the treads of wheels 21.

Referring particularly to Figs. II and XIV of the drawings, each wheel 21 is arranged in the assembly in the manner outlined generally above. In accordance with such arrangement each wheel is independently mounted and driven. Structurally each wheel comprises a tire 27 providing the wheel tread and which has a tapered fit on a felly 28 provided with a web extended to a roller bearing box 29. Bearing box 29 surrounds the main stem portion 30a of a central structure, or stub axle 30. The main stem portion 30a of the axle lies in one of the more extended openings 7 in the outer plate 4 of each of the side frames and lies against the outer face of a beam 12. Studs 31 passed through a plurality of bolt holes 32 in the beam secure the wheel structure to the beam.

It is to be understood that the wheels mounted to rotate in the beams may have associated with them driving connection of any suitable sort, such as a geared universal shaft drive of flexible endless connection. The latter form of driving connection being preferred, is disclosed in detail herein.

The driving elements included with the wheel as shown, comprise a tubular axle portion 30b, which extends through hole 15 in beam 12 and lies within the openings 6 and 7 provided respectively in inner plate 3 and outer plate 4 of the main side frame. This tubular extension 30b of the axle structure houses a drive shaft 33, which on its inner end carries means for connection with a source of motive power. Such means is shown as a sprocket 34 for connection with an endless flexible drive, and disposed inside the side frame structure of the vehicle. Within the structure of the wheel, shaft 33 carries a pinion 35 which meshes with an internal ring gear 36 carried interiorly of the wheel felly, so that the outer structure of the wheel is driven to rotate about a center located in the stem portion 30a of the axle structure.

It will be seen that each individual wheel is tied only to the beam 12 with which it has fixed connection and particularly to that end of the beam with which it is connected. When any wheel 21 meets with a track irregularity, its accommodation to such irregularity is compensated, without transmission to the fixed frame structure by a tendency for the beam with which it is connected to oscillate about its point of pivotal connection 20 with the fixed frame elements 3—4 between which it lies and to cause deflection of stabilizing and load-transmitting springs 22 interposed between the ends of beam 12 and the fixed frame structure. In this action is is of great advantage that transversely opposed wheels are not tied together by a common axle extended transversely across the vehicle, so that such wheels must make angular adjustment to their relative differences in vertical position. Under such conditions, and also on banked curves or the like, the individual wheel accommodation here provided avoids necessity for a wheel and axle contact providing relative rocking between a journal box and the axle, and eliminates the difficulties caused by wearing of such parts. Individual wheel mounting thus serves to carry forward substantially the advantages derived from tying the wheels to a centrally pivoted oscillating beam element.

As is indicated in Figs. I and II of the drawings, sprocket 34 carries a flexible endless connection desirably in the form of a sprocket chain 37 which also passes over one sprocket wheel of a double sprocket. The other sprocket wheel of the double sprocket engages a second endless flexible sprocket chain which passes over another sprocket 34 for driving the similarly arranged vehicle wheel 21 on the same side of the vehicle. One of such double sprockets 38 is carried by the shaft of a motor 39. The other double sprocket 40 arranged near the opposite side of the vehicle frame is carried by the shaft of a second motor 41 and its two sprocket wheels engage respectively with the sprockets 34 arranged to drive a pair of similarly constructed wheels 21 on that side of the vehicle. It will be observed in Fig. I of the drawings that the individual mounting of the several wheels of the vehicle leaves space for the reception of groups of battery cells 42 and 43 for the motors 39 and 41 below the upper level of the vehicle frame and between each two oppositely mounted wheels 21. Additional groups of battery cells 44 and 45 for energizing the two motors 39 and 41 are carried by the end structures 17 and 18 of the fixed frame.

The mounting for the driving motors of the vehicles is adapted particularly to take advantage of the use of flexible endless driving connections for the vehicle wheels and to increase the advantages of those driving connections and of the individual wheel mounting. The motor mounting is adapted also to economize space within the bounds of the vehicle frame. This mounting is shown in detail in Figs. IX to XII inclusive of the drawings. It comprises a cradle 46 having a central web 47 extended transversely of the vehicle and carrying an upper stiffening plate 74. On each side of central web 47 there are two transversely spaced wings 48 and 49 between which one of the motors is secured by means of bolts 50 passed through the bolt holes 50a illustrated in Fig. XI. Each of the wings is cut away at 51, to accommodate the sprocket-carrying shaft 52 at one end of the motor and the shaft-mounting boss 53 at the other end of the motor. The two pairs of wings 48 and 49 are offset from each other transversely of the cradle to mount motors 39 and 41 in slightly staggered relation with their shafts oppositely directed. Four horizontally arranged ears 54 are each supported on two sides by integration with one of the wings and with one of two extensions 47a of central web 47.

Motor-carrying cradle 46 is flexibly suspended from the two oscillatory beams 12 of the frame assembly. Adjacent the central portions of both beams, where oscillatory movement is negligible, bracket bars 10 are secured against the upper edges of the beams by bolts 55. As shown in Figs. I, II and X a flange 56 desirably is welded or otherwise secured to plates 3 and 4 of the fixed side frame. Inwardly of the vehicle structure brackets 10 are extended longitudinally of the vehicle as is shown in Figs. I to IX and have therein bolt holes to receive suspending bolts 57 for motor-carrying cradle 46. As shown, bolts 57 pass through bolt holes 58 in the horizontal ears 54 on the cradle.

The mounting of bolts 57 in brackets 10 is flexible to absorb slight relative movements of the oscillating beams and the motor-carrying cradle and to provide a slightly yielding reaction for the endless flexible connection between the driving motors and the vehicle wheels. This flexible mounting is in the form of a rubber sleeve or block 59 of substantial thickness, enclosed within a double-walled steel casing 60 which has a driving fit in the bolt hole of bracket 10 and which has a flange resting on the upper surface of the bracket. A washer 61 is carried beneath the head 57a of bolt 57 and lies against the upper end of rubber sleeve 59 and the inner wall of its casing 60. Rubber sleeves or blocks 59 compensate for any slight differences in position imparted to brackets 10 by the slight movement of beams 12 occurring in the regions in which the brackets are attached to the beams. As a matter of greater importance these rubber blocks by offering yielding resistance to driving forces tend to compensate slippage of wheels individually and collectively and to prevent such slippage from becoming progressive.

It frequently happens that because of conditions existing during use of the vehicle such as unequal weight distribution or conditions such as a wet track, one wheel has less rail adhesion than the other on the same side of the vehicle. Slippage of a wheel from any such cause tends to result in a surging effect, in which slippage passes back and forth between the two wheels connected with the same double sprocket by alternate overloading of the individual wheels beyond their adhesion to the rail. Thus as the wheel having lesser rail adhesion tends to slip and to present less reaction to the driving force of the sprocket, the driving shaft and sprocket crawl slightly toward the other wheel on the same side of the vehicle because of the physical requirement for equality in the reactions to the driving force. This compensatory movement is a slight longitudinal shifting movement if the same condition exists simultaneously on both sides of the vehicle, and a slight swinging movement at one end of the cradle if the condition exists only on one side of the vehicle. The movement is, of course, very slight and is provided adequately by distortion of the rubber sleeves or blocks 59 as the motor-carrying cradle tends to shift or swing. The action continues progressively in very small increments of movement until the slack of the sprocket chain having the lesser adhesion to the rails is exhausted by increase in center distance, and maximum tractive effort at the axes of the wheels is equalized. The resiliency of the rubber sleeves or blocks and the suspension of the motor-carrying cradle from them tends to restore the motor-carrying cradle to a position in which the driving sprockets of both motors are equally spaced from the axles of the wheels on both sides of the vehicle, when the condition causing wheel slippage no longer exists.

To explain the action in somewhat different terms, movement of the driving sprocket away from the axis of a wheel which has the lesser adhesion to the rails supplies in the assembly the reaction to the driving force which is lacking because of such low rail adhesion. This prevents a demand for excessive reaction from being imposed on the other wheel driven from the same sprocket, and permits both wheels to respond to power application apportioned to their grip on the rails. The drive thus can build up to maximum tractive effort without any wide adjusting movement of the driving sprockets and without surging in the transmission of power. There is thus no opportunity for a slipping tendency when once created progressively to increase by progressive decrease in adhesion to the rails, or for the tractive effort on one side of the vehicle to be thrown wholly to one of the wheels driven from the same double sprocket because of slippage of the other wheel connected with that sprocket.

The suspension of the motor and drive from the oscillating beams has a further advantage rising from the fact that such mounting relates the motor and drive definitely with the vehicle wheels. If the sprocket chains of the drive become slack from wear, it is possible to tighten them without altering the relation between the sprockets and the wheels merely by taking up on the suspension bolts 57, slightly to raise the motor-carrying assembly. Although two motors are shown and described, it should be clear without illustration that a single motor can be used and that it can be suspended in similar manner from the oscillating beams. In such case the driving connections may be made as simple as those shown and described in connection with the use of two oppositely positioned motors, merely by arranging the single motor to extend transversely of the vehicle and by taking power from both ends of the motor shaft or a related shaft.

As will appear from the above, the oscillating beam of the frame structure performs a variety of functions in the assembly. The beams serve to mount the vehicle wheel and to accommodate bearing structures for those wheels; they serve to transmit load to the fixed frame of the vehicle at points removed from the central zone to which they, the beams transmit tractive effort; they serve to mount a brake system in fixed relation to the vehicle wheels; they serve to suspend both the driving motor or motors and the transmission and serve to maintain a desirable relationship between the transmission and the wheels of the vehicle. The vehicle thus includes all the above-noted elements in an integrated assembly movable independently of the frame but having yielding connection therewith The self-propelled vehicle of this invention provides a battery-propelled vehicle in which the batteries are completely enclosed within the vehicle frame while minimizing the height of the vehicle frame and without detracting from other features providing good tractive effort, smooth running and good load-carrying properties. As noted, such arrangement is made possible by the individual mounting of the wheels in the frame structure which provides space within the bounds of the frame structure and intersecting the axes of the wheels, which space would be interrupted by the axles if axles were included in the vehicle assembly. It thus is possible to use the space within the bounds of the frame down to the lower end of the vehicle frame for housing the motor or motors and the battery or batteries for energizing them. This gives the general advantage of minimizing the overall height of the vehicle structure, which is of advantage in mines and like locations. It also gives the advantage that there need be no upward extension of motor or batteries which would tend to over-balance the vehicle. This is of great advantage when the vehicle is used as a locomotive coupled to a rolling load at a point below the upper end of the frame.

As has been explained above, the wheel mounting which provides space within the overall bounds of the vehicle for mounting the batteries is an arrangement which also utilizes to a maximum extent the advantages of connecting the wheels with a member which is independent of movement of the fixed frame. Thus the mounting of the vehicle wheels individually in the two oscillating beams of the frame structure is a desirable feature apart from the fact that it provides increased space within the bounds of the vehicle frame for the reception of storage battery cells. The wheel mounting arrangement as disclosed is in itself desirable whether or no it be associated with endless flexible driving connections, and as associated with driving connections of that sort is of particularly great desirability.

It is of course to be understood that the rubber blocks included in the motor suspension may be composed of any of the various rubber-like plasticized high polymer materials popularly known as synthetic rubber as well as of natural rubber.

Having shown and described an exemplary embodiment of my invention, it is to be understood that numerous structural changes may be made in such exemplary embodiment within the bounds of the invention as defined in the appended claims.

I claim as my invention:

1. In a self-propelled railway vehicle comprising a main frame structure, the combination of oscillatory beam elements extended along the two opposite sides of said main frame, pivot structures pivotally interconnecting the said beams and the said main frame intermediate the length of each said beam and providing relative swinging movement in a vertical plane and limited bodily vertical movement between each of said beams and said main frame, at least two wheels mounted on each said beam and rotatable each on an individual axle journalled on structure carried by each of the two said beams, yielding elements interposed between the said beams and the said main frame at points removed from the pivot points therebetween to transmit load between the said assembly of oscillatory beams and wheels mounted thereon and the said main frame, a driving motor carried by said oscillatory beams, a battery for energizing said motor, said motor and battery being contained within the bounds of the said main frame structure and in the space between oppositely mounted wheels in a position intersecting the axes of rotation of the wheels and driving connections from said motor to said wheels.

2. In a self-propelled railway vehicle comprising a main frame structure, the combination of oscillatory beam elements extended along the two opposite sides of said main frame, pivot structures pivotally interconnecting the said beams and the said main frame intermediate the ends of each said beam for relative swinging movement between the beam and the frame in a vertical plane, at least two wheels mounted on each said beam and rotatable each on an individual axle journalled on structure carried individually by each of the two said beams, yielding elements interposed between the said beams and the said main frame at points removed from the pivot points therebetween to transmit load between the said assembly of oscillatory beams and wheels mounted thereon and the said main frame, a driving motor, a battery for energizing said motor, said motor and battery being contained within the bounds of the said main frame structure and in the space between oppositely mounted wheels in a position intersecting the axes of the wheels, endless flexible driving connections between the said motor and two wheels carried by the same oscillatory beam, and mounting means comprising yielding elements suspending the said motor from said beams and deformable horizontally in shifting of the motor position under unequal rail adhesion of the said two wheels having flexible endless driving connection to said motor to compensate wheel slippage and to return the motor to normal position when the conditions causing wheel slippage no longer exist.

3. In a self-propelled railway vehicle comprising a main frame structure, the combination of oscillatory beam elements extended along the two opposite sides of the said main frame, pivot structures pivotally interconnecting the said beams and the said main frame intermediate the length of each said beam and providing relative swinging movement in a vertical plane and limited bodily vertical movement between each of said beams and said main frame, yielding elements interposed between the said beams and the said main frame at points removed from the pivot points therebetween to transmit load between the said assembly of oscillatory beams and wheels mounted thereon and the said main frame, at least two wheels mounted on each said beam and rotatable each on an individual axle journalled on structure carried individually by each of the two said beams, a driving motor yieldingly supported from said beams, and driving connections from said motor to said wheels.

4. In a self-propelled railway vehicle comprising a main frame structure, the combination of oscillatory beam elements extended along the two opposite sides of said main frame, pivot structures pivotally interconnecting the said beams and the said main frame intermediate the length of said beam and providing relative swinging movement in a vertical plane and limited bodily vertical movement between each of said beams and said main frame, yielding elements interposed between the said beams and the said main frame at points removed from the pivot points therebetween to transmit load between the said assembly of oscillatory beams and wheels mounted thereon and the said main frame, at least two wheels mounted on each said beam and rotatable each on an individual axle journalled on structure carried individually by each of the two said beams, a driving motor yieldingly supported from said beams, and flexible endless driving connections between the said motor and two wheels carried by the same oscillatory beam.

5. In a self-propelled railway vehicle comprising a main frame structure, the combination of oscillatory beam elements extended along the two opposite sides of said main frame, pivot structures pivotally interconnecting the said beams and the said main frame intermediate the length of each said beam and providing relative swinging movement in a vertical plane between each of said beams and said main frame, yielding elements interposed between the said beams and the said main frame at points removed from the pivot points therebetween to transmit load between the said assembly of oscillatory beams and wheels mounted thereon and the said main frame, at least two wheels mounted on each said beam and rotatable each on an individual axle journalled on structure carried individually by each of the two said beams, a driving motor, suspending structure comprising a resilient block suspending said motor from said beams independently of the said main frame, and flexible endless driving connections between the said motor and two wheels carried by the same oscillatory beam transmitting driving power to both the said wheels, the said resilient block of the suspending structure being in opposition to the reactive forces exerted by the two said wheels through the said flexible driving connections and the said resilient block being deformable horizontally in shifting of the motor position under unequal rail adhesion of the two wheels having flexible endless driving connection to said motor to compensate wheel slippage and to return the motor to normal position when the conditions causing wheel slippage no longer exist.

6. In a self-propelled railway vehicle comprising a main frame structure, wheel mounting structures connected with said main frame structure along the sides thereof, two wheels carried by each said wheel-mounting structure each on an individual axle journalled in the said structure, a driving motor, a suspending structure comprising a resilient block yieldingly suspending said motor from said wheel mounting structures, and flexible endless driving connections between the said motor and two wheels mounted on the same side of the said main frame for transmitting driving power to both the said wheels, the said resilient block of the suspending structure acting in opposition to the reactive forces exerted by the two said wheels through the said flexible driving connections and the said resilient block being deformable horizontally in shifting of the motor position under unequal rail adhesion of the two wheels having flexible endless driving connection to said motor to compensate wheel slippage and to return the motor to normal position when the conditions causing wheel slippage no longer exist.

DALLAS P. GRAHAM.

REFERENCES CITED

The following references are of record in the file of this patent:

UNITED STATES PATENTS

| Number | Name | Date |
|---|---|---|
| 494,319 | Brown | Mar. 28, 1893 |
| 555,392 | Neer | Feb. 25, 1896 |
| 682,104 | Middleton | Sept. 3, 1901 |
| 1,157,168 | Mahana | Oct. 19, 1915 |
| 1,317,518 | Macfarren | Sept. 30, 1919 |
| 1,539,841 | Holy | June 2, 1925 |
| 1,583,241 | Arnold | Mar. 4, 1926 |
| 1,947,683 | Townsend | Feb. 20, 1934 |
| 1,994,304 | Devlin | Mar. 12, 1935 |
| 2,020,764 | Bradford | Nov. 12, 1935 |
| 2,023,856 | Sanders | Dec. 10, 1935 |
| 2,381,488 | Coulson | Aug. 7, 1945 |
| 2,412,657 | Stoltz | Dec. 17, 1946 |